(12) United States Patent
Molisch

(10) Patent No.: US 7,403,746 B2
(45) Date of Patent: Jul. 22, 2008

(54) ADAPTIVE FRAME DURATIONS FOR TIME-HOPPED IMPULSE RADIO SYSTEMS

(75) Inventor: Andreas F. Molisch, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 401 days.

(21) Appl. No.: 11/199,023

(22) Filed: Aug. 8, 2005

(65) Prior Publication Data

US 2006/0245471 A1  Nov. 2, 2006

Related U.S. Application Data

(63) Continuation-in-part of application No. 11/029,132, filed on Jan. 4, 2005.

(51) Int. Cl.
H04B 17/00 (2006.01)
(52) U.S. Cl. ............... 455/67.11; 455/63.1; 455/67.13; 375/138; 375/239; 375/135; 375/325; 375/242; 375/147
(58) Field of Classification Search ........... 455/67.11, 455/63.1, 67.13, 108; 375/138, 239, 135, 375/136, 296, 316, 325, 340, 242, 147, 295
See application file for complete search history.

(56) References Cited

U.S. PATENT DOCUMENTS

| | | | |
|---|---|---|---|
| 6,002,710 A * | 12/1999 | Hendrickson et al. | 375/149 |
| 6,111,536 A * | 8/2000 | Richards et al. | 342/125 |
| 6,256,337 B1 * | 7/2001 | Hendrickson et al. | 375/140 |
| 6,275,519 B1 * | 8/2001 | Hendrickson | 375/138 |
| 6,516,184 B1 * | 2/2003 | Damgaard et al. | 455/86 |
| 6,717,992 B2 * | 4/2004 | Cowie et al. | 375/316 |
| 6,754,506 B2 * | 6/2004 | Chang et al. | 455/522 |
| 6,901,246 B2 * | 5/2005 | Bobier et al. | 455/108 |
| 6,954,480 B2 * | 10/2005 | Richards et al. | 375/130 |
| 6,961,352 B2 * | 11/2005 | Bouquier et al. | 370/503 |
| 6,961,862 B2 * | 11/2005 | Best et al. | 713/401 |
| 6,999,445 B1 * | 2/2006 | Dmitriev et al. | 370/342 |
| 7,082,153 B2 * | 7/2006 | Balachandran et al. | 375/138 |
| 7,095,789 B2 * | 8/2006 | Ware et al. | 375/257 |
| 7,103,109 B2 * | 9/2006 | Nakache et al. | 375/295 |
| 7,164,710 B2 * | 1/2007 | Komaili et al. | 375/229 |
| 7,187,715 B2 * | 3/2007 | Balachandran et al. | 375/242 |
| 7,230,980 B2 * | 6/2007 | Langford et al. | 375/219 |
| 7,251,225 B2 * | 7/2007 | Lundby et al. | 370/331 |
| 7,254,202 B2 * | 8/2007 | Cattaneo et al. | 375/354 |
| 7,286,604 B2 * | 10/2007 | Shattil | 375/260 |
| 2003/0069025 A1 | 4/2003 | Hoctor et al. | |

OTHER PUBLICATIONS

M. Win and R. A. Scholtz, "Ultra-Wide Band Width Time-Hopping Spread-Spectrum Impulse Radio for Wireless Multiple-Access Communications," IEEE Trans. On Communications, vol. 48, No. 4 Apr. 2000, pp. 679-691.

S. Gezici, H. Kobayashi, H. V. Poor, and A. F. Molisch, "Effect of timing jitter on the tradeoff between processing gains," Proc. ICC 2004, pp. 3596-3600, 2004.

S. Gezici, F. Tufvesson, and A. F. Molisch, "On the performance of transmitted-reference impulse radio", Proc. Globecom 2004.

Guvenc et al. "Adaptation of multiple access parameters in time hoping UWB cluster based wireless sensor network," 2004.

* cited by examiner

Primary Examiner—Marceau Milord
(74) Attorney, Agent, or Firm—Dirk Brinkman; Clifton D. Mueller; Gene V. Vinokur

(57) ABSTRACT

A method determines a duration of a frame in an impulse radio system for radio ranging. Channel state information of a channel between two transceivers is estimated periodically. A signal to noise and interference ratio is also estimated periodically. The frame duration of the frame is then determined according to the channel state information and the signal to noise and interference ratio.

14 Claims, 4 Drawing Sheets

200

ADAPTIVE FRAME DURATIONS FOR TIME-HOPPED IMPULSE RADIO SYSTEMS

RELATED APPLICATION

This application is a Continuation-In-Part of U.S. patent application Ser. No. 11/029,132 entitled "Adaptive Frame Durations for Time-Hopped Impulse Radio Systems" filed by Molisch et al. on Jan. 4, 2005.

FIELD OF THE INVENTION

The invention relates generally to communication systems, and more particularly to modulation formats used in wireless communication systems.

BACKGROUND OF THE INVENTION

In the United States, the Federal Communications Commission (FCC) allows a restricted unlicensed use of ultra-wide bandwidth (UWB) signals for wireless communication systems, "First Report and Order," Feb. 14, 2002. The UWB signals must be in the frequency range from 3.1 to 10.6 GHz, and have a minimum bandwidth of 500 MHz. The FCC order also limits the power spectral density and peak emissions power of UWB signals to less than −43.1 dBm/MHz.

One modulation method for UWB uses extremely short time pulses, e.g., 1/1,000,000,000 of a second or less, to generate signals with bandwidths greater than 500 MHz which corresponds to a wavelength of about 300 mm. Wireless systems that use short pulses are commonly referred to as impulse radio (IR) systems.

As shown in FIG. 1A, four different modulation techniques are commonly used for IR systems: pulse position modulation (PPM) 11, pulse amplitude modulation (PAM) 12, on-off keying (OOK) 13, and bi-phase shift keying (BPSK) 14.

As an advantage, UWB systems achieve high data rates, and are resistant to multi-path impairments. This is due to large processing gains. Additionally, IR systems enable low cost, low duty cycle, low power transceivers that do not require local oscillators for heterodyning. Because UWB transceivers are primarily implemented in the digital domain, the UWB transceivers can be integrated in a semiconductor chip. In UWB systems, multiple transceivers concurrently share the same spectrum without interference. UWB systems are ideal for short range, high-speed networks in homes, businesses, and educational institutions. Sensor networks can also use UWB transceivers.

A time-hopping (TH) IR is described by M. Win and R. A. Scholtz, "Ultra-Wide Band Width Time-Hopping Spread-Spectrum Impulse Radio for Wireless Multiple-Access Communications," in IEEE Trans. On Communications, Vol. 48, No. 4 Apr. 2000, pp. 679-691. In that TH-IR system, each bit or symbol is represented by $N_f$ pulses, where $N_f$ is a positive integer. The time to transmit a bit is $T_s$. This is called the symbol duration. The time $T_s$ is further partitioned into frames $T_f$, and the frames are partitioned into chips $T_c$, corresponding typically to a pulse duration. If $N_c$ represents the number of chips in a frame and $N_f$ represents the number of frames in a symbol, then $T_s$, $T_f$ and $T_c$ are related by $$T_s = N_f T_f = N_f N_c T_c. \quad (1)$$

FIG. 1B shows the relationship between the symbol time $T_s$ 101, the frame duration $T_f$ 102, and the chip duration $T_c$ 103 for pulses 104 for an example prior art TH-IR waveform 110 for a '0' bit, and a waveform 120 for a '1' bit. Typically, the pulses are spaced pseudo-randomly among the available chips in a frame according to a "time-hopping" code to minimize multi-user interference.

As stated above, the modulation can be binary phase shift keying (BPSK). With BPSK, each bit b is represented as either a positive or negative one, i.e., $b \in \{-1, 1\}$. The transmitted signal has the form $$s(t) = \sum_{i=1}^{\infty} \sum_{j=1}^{N_f} h_{i,j} b_{\lfloor i/N_f \rfloor} p(t - jT_f - c_j T_c), \quad (2)$$

where $c_j$ represents the $j^{th}$ value of the TH code, in a range $\{0, 1, \ldots, N_c-1\}$, and b is the $i^{th}$ modulation symbol. Additionally, an optional sequence denoted as $h_{i,j}$ can be applied to each pulse in the transmitted signal to 'shape' the spectrum of the transmitted signal and to reduce spectral lines. The sequence, $h_{i,j}$, is called a polarity scrambling sequence with values of either +1 or −1. Different amplitudes are also possible to further shape the spectrum.

FIG. 2 shows a conventional coherent TH-IR receiver 200. The receiver includes an automatic gain control (AGC) unit 210 coupled to an amplifier 220 that is connected to the receive antenna 230. The receiver also includes synchronization 240, timing control 250, channel estimation 260, MMSE equalizer 270, and decoder 280 units. Rake receiver fingers 290 input to an adder 295. Each rake receiver finger includes a pulse sequence generator, correlator and weight combiner. The rake receiver fingers reduce multipath interference.

An appropriate duration of the frame needs to be selected. A short frame duration decreases multiple access interference (MAI), and can also increase performance in the presence of timing jitter, as described by S. Gezici, H. Kobayashi, H. V. Poor, and A. F. Molisch, "Effect of timing jitter on the tradeoff between processing gains," Proc. ICC 2004, pp. 3596-3600, 2004. On the other hand, interframe interference (IFI) can occur when the frame duration is shorter than a maximum excess delay of the channel impulse response. In conventional TH-IR systems, the frame duration is fixed and cannot be changed.

Therefore, it is desired to select adaptively the frame duration.

SUMMARY OF THE INVENTION

The invention provides a method and apparatus for adaptively determining a duration of a frame in a time-hopped, impulse radio (TH-IR) system according to a current channel state and interference. In a multi-user system, interference is due to signals from other transceivers and noise. Therefore, interference is a measure of the signal to noise and interference ratio (SNIR).

A receiver acquires channel state information (CSI), specifically, a small-scale average power delay profile, as well as the average SNIR. The CSI and power delay profile are used to determine an optimal frame duration. The frame duration can be determined in either the receiver or the transmitter. The frame duration can be updated periodically as the CSI and SNIR change over time.

DETAILED DESCRIPTION OF THE PREFERRED EMBODIMENT

Figure 1A:
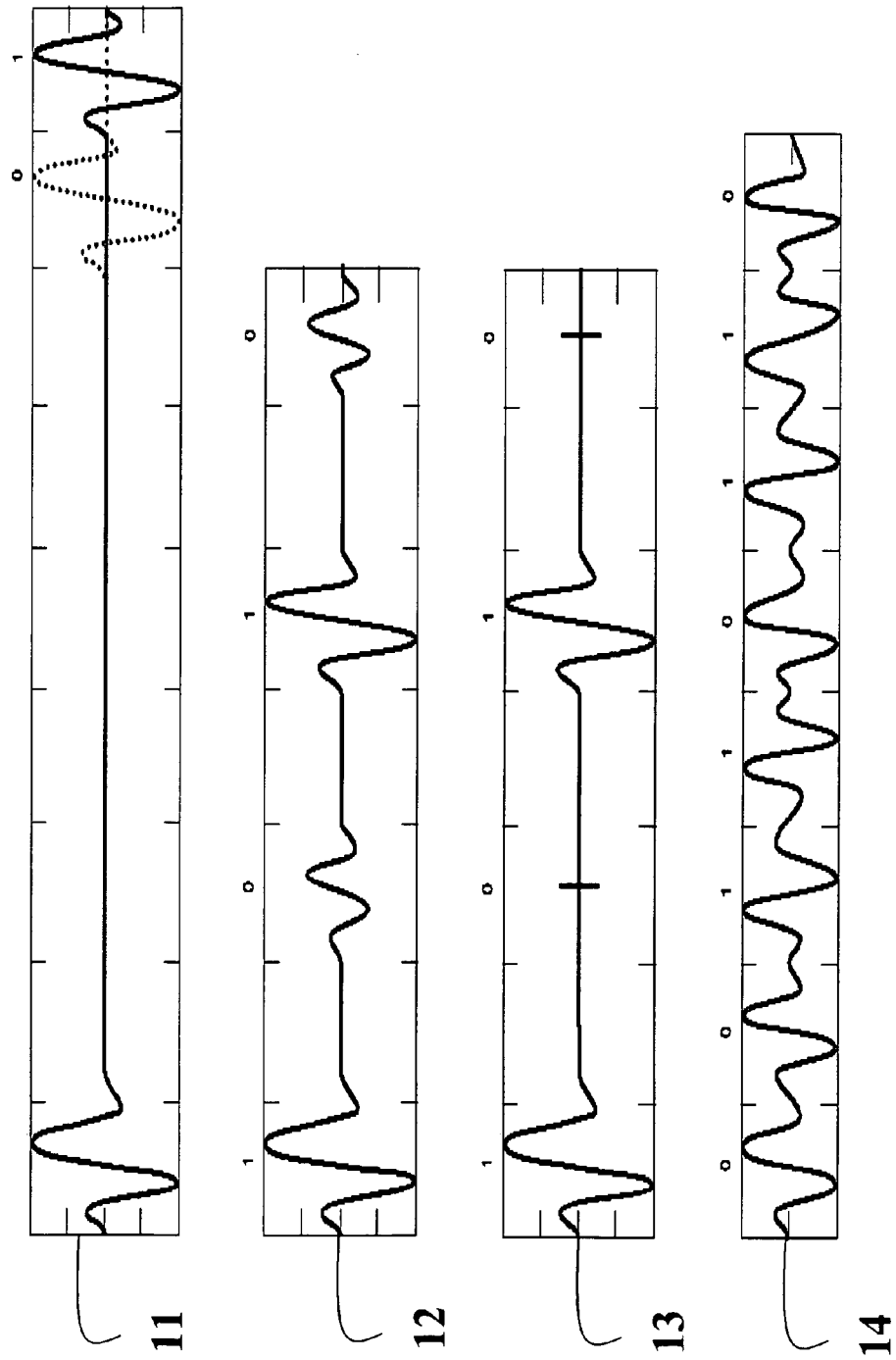
FIG. 1A is a timing diagram of prior art modulation techniques.
Figure 1B:
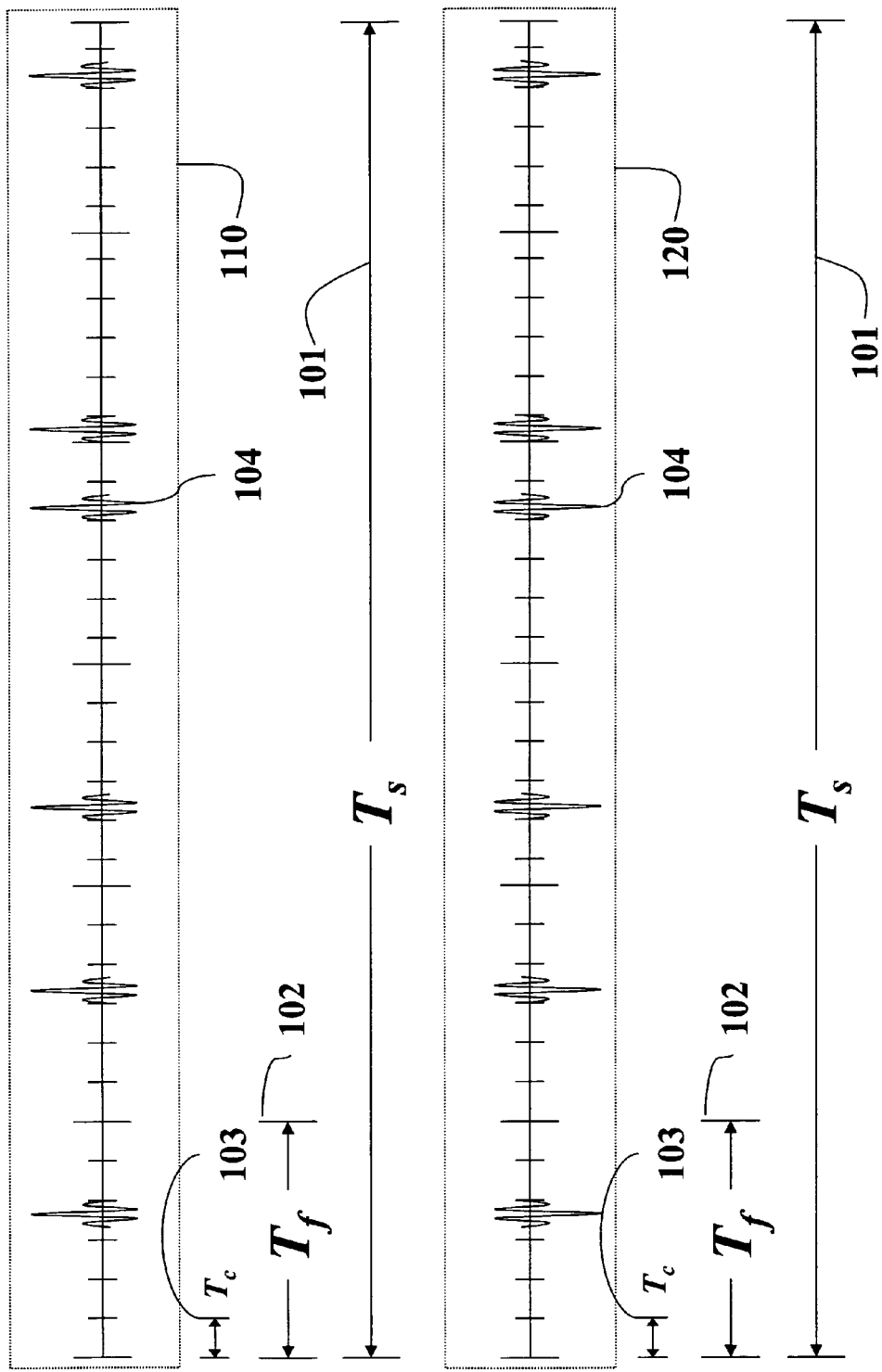
FIG. 1B is a timing diagram of prior art TH-IR modulation.
Figure 2:
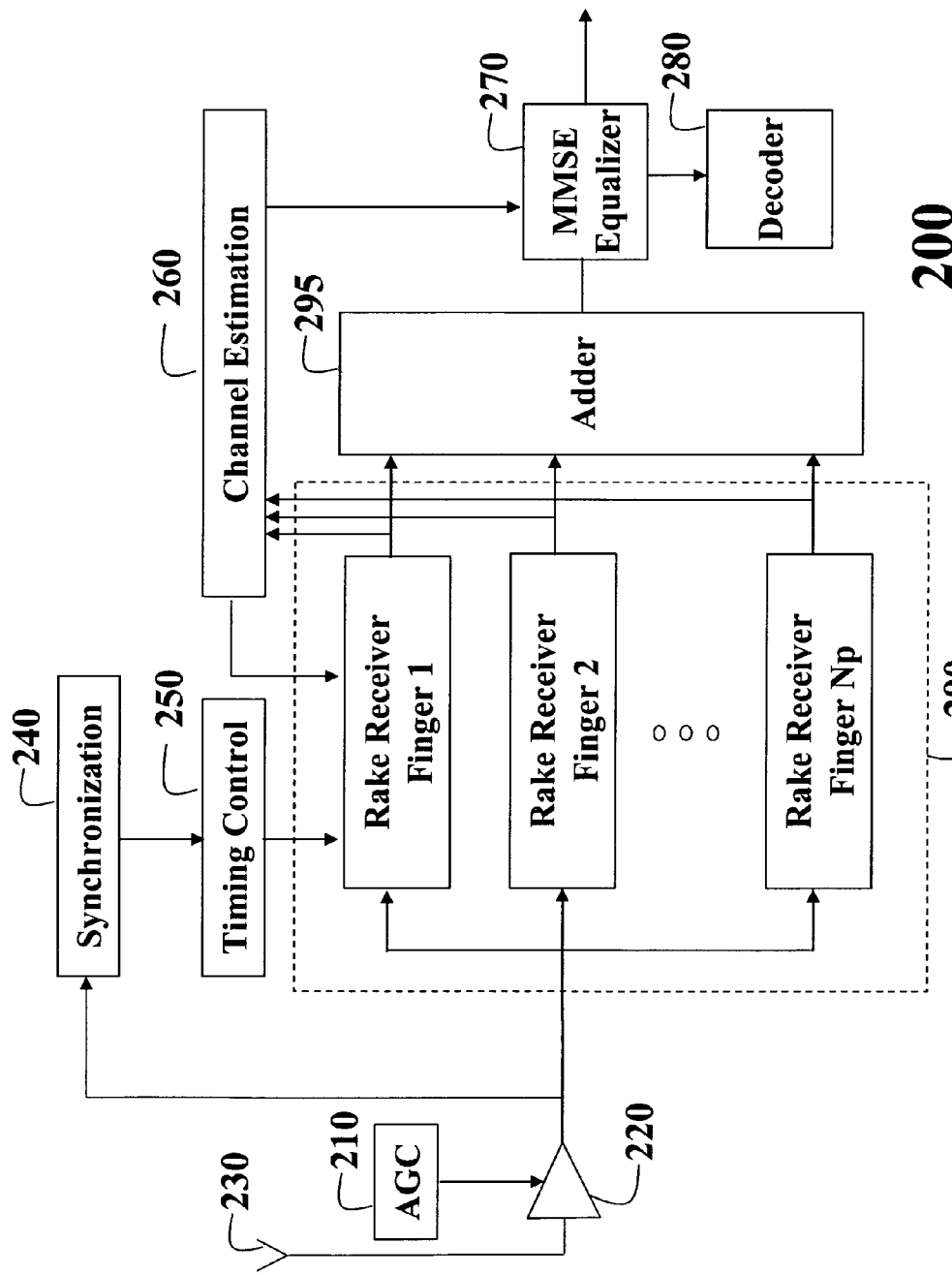
FIG. 2 is a block diagram of a prior art TH-IR receiver.
Figure 3:
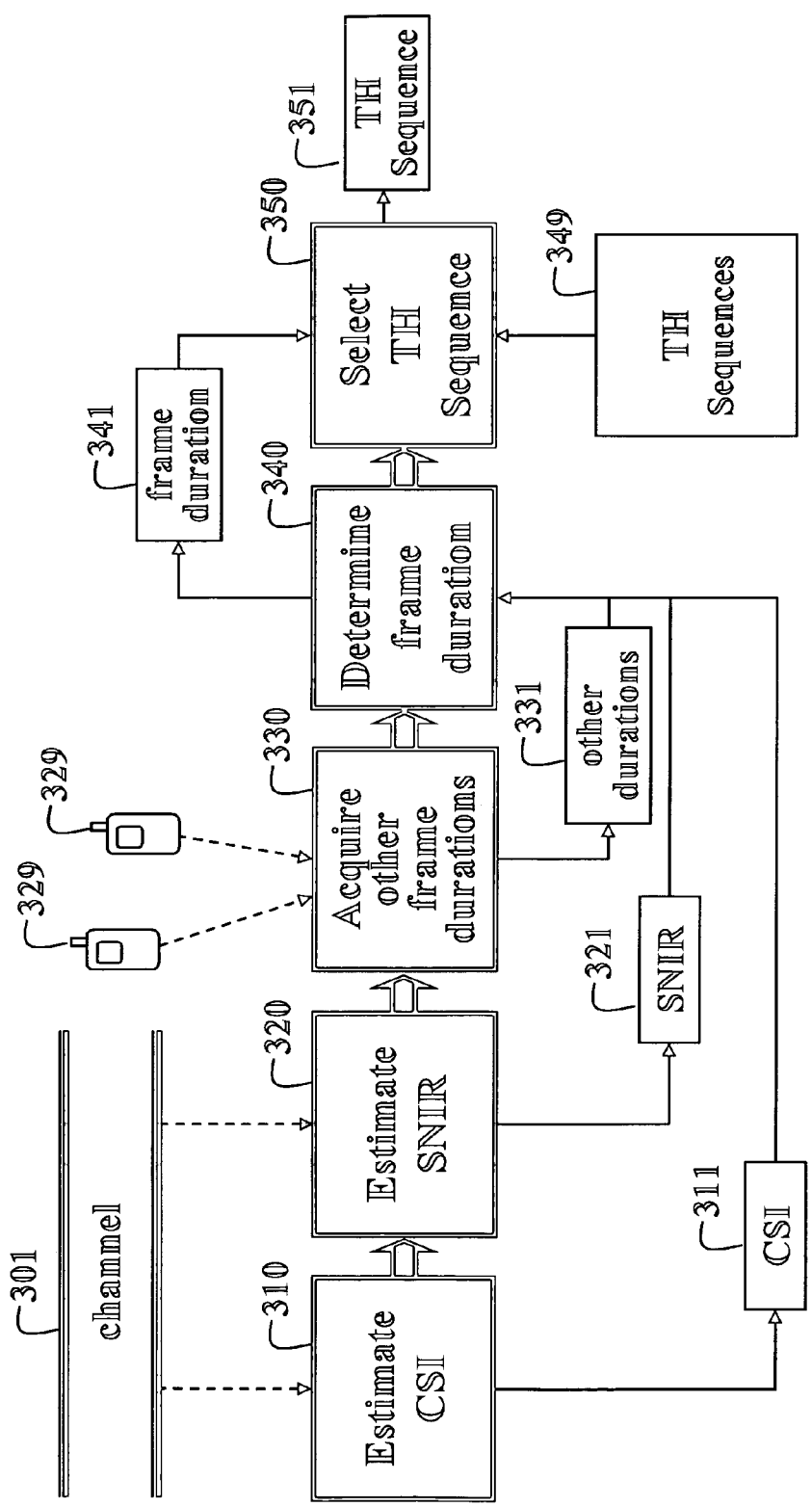
FIG. 3 is flow diagram of a method for determining a frame duration according to the invention.

Our invention provides a system and method for adaptive selection of a frame duration for transceivers in radio system. The frame duration depends on the signal to noise and interference ratio (SNIR) and channel state information (CSI). The method can be applied to coherent transceivers in a time-hopped, impulse radio (TH-IR) system, as well as in transmitted-reference systems involving time hopping, and to time-hopping systems with incoherent transceivers. It should be noted that at any one time the transceiver can either be transmitting or receiving.

In a first step, the receiver estimates periodically 310 the CSI 311 of the channel 301. This can be done in two ways. The receiver can estimate an instantaneous CSI or an average CSI. In the latter case, the receiver estimates a small-scale, averaged power delay profile or an approximation thereof. An accurate CSI is not necessary for the invention. An approximation of the small-scale averaged power delay profile or even just an estimate of the root-mean-square (RMS) delay spread can provide benefits. Whether to use the instantaneous or the averaged CSI depends mostly on a ratio between symbol duration and coherence time of the channel. In quasi-static channels, the instantaneous CSI is preferred.

In a second step, the receiver estimates periodically 320 the SNIR 321 of the channel 301. The SNIR can be estimated during a 'quiet' period when no data is transmitted to the receiver. During this time, the receiver is active and 'listening' to the channel. There are a great number of ways to estimate CSI and SINR. The invention can work with any conventional method to make these estimates. An overview of channel and interference estimation can be found in J. G. Proakis, *Digital Communications*, fourth edition, McGraw-Hill, New York, 2001.

In an optional third step, the transceiver acquires periodically 330 frame durations 331 used by other UWB transceivers 329. This can be done by explicit transmissions by the other transceivers. For example, in the context of a network according to the IEEE 802.15.4 standard, a central coordinator device transmits beacons. The beacons contain the frame durations for all other devices under the control of the coordinator device.

After the CSI and the SNIR have been estimated, an optimum frame duration 341 is determined 340. The frame duration can be determined in either the transmitter or the receiver. The optimum frame duration minimizes the RMS error between a training signal and the received signal, coded or uncoded bit error rate (BER), or other suitable criteria. For example, the BER for a transmitted-reference scheme in the presence of noise only is described by S. Gezici, F. Tufvesson, and A. F. Molisch, "On the performance of transmitted-reference impulse radio", Proc. Globecom 2004. Alternatively, the optimum frame duration is determined from the BER or RMS error from transmitted data. By 'dithering' the frame duration in the transmitter, the transceiver can determine whether a smaller or larger frame duration improves the BER. This information is then supplied to the transmitter, and the frame duration is adapted accordingly.

We also optimize the time hopping (TH) sequence for the optimum frame duration. Conventionally, the TH sequence is preselected and optimized for a predetermined fixed frame duration. The preselected TH sequence attempts to minimize the number of collisions of pulses per symbol, irrespective of varying relative delays between different transceivers.

The invention adaptively selects 350 a TH sequences 351 that retains good 'collision' properties when truncated to shorter durations. A discrete set of sequences 349 with different lengths can be used. The transmitter selects from this set of sequences the optimum sequence 351 for the optimum frame duration 341.

Ranging

Radio signals that use time hopping and/or polarization hopping can also be used for ranging. In a ranging application, a distance between a transmitter and a receiver is determined from the time-of-arrival (TOA) of a received signal. For these applications, it is also useful to adapt the duration of the frame depending on a state of the channel, and a structure of the receiver. Non-coherent receivers are generally more sensitive to interference from previously received pulses than coherent receivers.

By increasing the duration of frames, inter-frame-interference (IFI) can be reduced in the receiver. One way to increase the duration of a frame is by spacing pulses farther apart in time. Therefore, for ranging applications, the duration of frames should be increased according to the channel state and receiver structure.

We also note that adaptive frame duration, as described above, can be used in conjunction with other spread spectrum radio signals, such as UWB signals. In particular, adaptive frame duration can be applied to a sequence of pulses transmitted at integer multiples of the frame duration, with a polarity of +1 and −1, or with an amplitude of zero, i.e., certain pulses are suppressed. In this case, adapting the frame duration means changing the duration between the pulses. Similarly, the method can be applied when only pulses with +1 or 0 amplitude are transmitted at times that are integer multiples of the frame duration.

In a network where one 'master' device communicates with multiple 'slave' devices, the master can either set a single frame duration for the entire network, or set the frame durations for the slaves individually. In order to set the frame duration for the entire network, the master broadcasts the duration information. In this case, the selected frame duration is based on the channel state as well as the structure of the slave devices. Similar considerations are also true in a peer-to-peer network.

EFFECT OF THE INVENTION

The selection of the frame duration according to the invention reduces interframe interference and multiple access interference. Depending on the environment in which the system is operating, the invention adjusts the frame duration to minimize interframe interference, while at the same time retaining good multiple access capabilities.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for determining a duration of a frame in an ultra-wide bandwidth impulse radio system, comprising:

determining a frame duration of a radio signal as transmitted by a transmitter according to channel state information, in which the radio signal uses a sequence of ultra-wideband pulses;

transmitting frames according to the frame duration from the transmitter to a receiver as the ultra-wide bandwidth pulses; and estimating a time of arrival of the ultra-wide bandwidth pulses in the receiver to determine a distance between the transmitter and the receiver.

2. The method of claim 1, in which the transmitter periodically estimates the channel state information.

3. The method of claim 2, in which the frame duration is longer for non-coherent receivers than for coherent receivers.

4. The method of claim 1, and further comprising:
increasing the frame duration by increasing a spacing of the ultra-wide bandwidth pulses farther apart in time.

5. The method of claim 4, the ultra-wide bandwidth pulses have a polarity of +1, −1, and 0.

6. The method of claim 4, the ultra-wide bandwidth pulses have a polarity of +1, and −1.

7. The method of claim 1, in which the radio signal is an ultra-wide bandwidth spread spectrum radio signal.

8. The method of claim 1, where the radio signal is a time-hopped signal, i.e., the position of the ultra-wide bandwidth pulses within a frame is determined by a psuedorandom sequence.

9. The method of claim 1, in which the frame duration is set identically by a master device for all slave devices in the radio system.

10. The method of claim 1, in which the frame duration is set individually by a master device for each slave device in the radio system.

11. The method of claim 1, in which two devices negotiate the frame duration between themselves.

12. The method of claim 1, in which the receiver periodically estimates the channel state information of a channel.

13. A method for determining a duration of a frame in an ultra-wide bandwith impulse radio system, comprising:
determining a frame duration of a radio signal as transmitted by a transmitter according to a structure of a receiver;
transmitting frames according to the frame duration from the transmitter to the receiver as pulses; and
estimating a time of arrival of the pulses in the receiver to determine a distance between the transmitter and the receiver.

14. A method for determining a duration of a frame in an impulse radio system, comprising:
determining a frame duration of a radio signal as transmitted by a transmitter according to channel state information and a structure of a receiver, in which the radio signal uses a sequence of ultra-wideband pulses;
transmitting frames according to the frame duration from the transmitter to the receiver as the ultra-wide bandwidth pulses and
estimating a time of arrival of the ultra-wide bandwidth pulses in the receiver to determine a distance between the transmitter and the receiver.

* * * * *